United States Patent
Tal et al.

(10) Patent No.: US 11,433,398 B1
(45) Date of Patent: Sep. 6, 2022

(54) HANDHELD SYSTEM AND METHOD FOR STORING AND GRINDING HERBS

(71) Applicant: Fonz Bros., Ltd., Galil Elion (IL)

(72) Inventors: Gilad Tal, Galil Elion (IL); Yonatan Tal, Galil Elion (IL); Oded Tal, Galil Elion (IL)

(73) Assignee: FONZ BROS, LTD., Galil Elion (IL)

( * ) Notice: Subject to any disclaimer, the term of this patent is extended or adjusted under 35 U.S.C. 154(b) by 137 days.

(21) Appl. No.: 16/813,910

(22) Filed: Mar. 10, 2020

(51) Int. Cl.
  *B02C 4/26* (2006.01)
  *A47J 42/24* (2006.01)
  *B02C 18/14* (2006.01)
  *B02C 18/16* (2006.01)

(52) U.S. Cl.
  CPC ............... *B02C 4/26* (2013.01); *A47J 42/24* (2013.01); *B02C 18/145* (2013.01); *B02C 18/16* (2013.01); *B02C 2018/162* (2013.01)

(58) Field of Classification Search
  CPC .. A47J 42/22; A47J 42/24; A47J 42/28; A47J 42/32; A47J 42/34; A47J 42/38; A47J 42/40; A47J 42/42; B02C 4/26; B02C 18/145; B02C 18/16; B02C 2018/162
  See application file for complete search history.

(56) References Cited

U.S. PATENT DOCUMENTS

| | | | | |
|---|---|---|---|---|
| 2,900,140 A * | 8/1959 | Schuhmann | ............ | A47J 42/40 361/194 |
| 4,697,749 A * | 10/1987 | Holcomb | ................ | A47J 42/34 241/262 |
| 8,128,013 B2 * | 3/2012 | Bartelt | ................. | B02C 18/142 241/242 |
| 2005/0009461 A1 * | 1/2005 | Palese | .................... | A22C 9/008 452/142 |
| 2011/0100383 A1 * | 5/2011 | Tilley | .................... | B02C 18/145 131/280 |
| 2012/0091244 A1 * | 4/2012 | Loos | ....................... | B02C 18/16 241/279 |
| 2014/0209718 A1 * | 7/2014 | Bevins | ..................... | B09B 3/00 241/24.11 |
| 2015/0231637 A1 * | 8/2015 | Ali | .......................... | B02C 4/42 241/47 |

(Continued)

FOREIGN PATENT DOCUMENTS

WO   WO-2012116457 A1 *   9/2012   ............. A47J 42/24

OTHER PUBLICATIONS

English translate (WO2012116457A1), retrieved date Jul. 9, 2021.*

*Primary Examiner* — Adam J Eiseman
*Assistant Examiner* — Mohammed S. Alawadi
(74) *Attorney, Agent, or Firm* — Sandy Lipkin

(57) ABSTRACT

A handheld system and method for storing and grinding herbs—such as, but not limited to tobacco, marijuana and the like. The device having three main components: a first component being a two-part, hermetically sealed case allowing herbs to be stored therein; a second component being a crusher with axial star blades; and a third component being a finger wheel allowing a user to rotated said crusher thereby reducing herb clusters to a consistent aggregate according to a user's preference. The hermetically sealed case allowing a user to then store aggregated herbs therein. An object of the invention is to allow a user to crush and store herbs in a portable, sealed container.

3 Claims, 17 Drawing Sheets

(56) References Cited

U.S. PATENT DOCUMENTS

| | | | | |
|---|---|---|---|---|
| 2015/0266029 A1* | 9/2015 | Dooley | ................. | D21B 1/061 |
| | | | | 241/23 |
| 2016/0278430 A1* | 9/2016 | Shalom | ................... | A24F 17/00 |
| 2017/0001200 A1* | 1/2017 | Leffel | ................... | A61K 36/185 |
| 2017/0297033 A1* | 10/2017 | Li | ........................... | A47J 42/34 |
| 2019/0104887 A1* | 4/2019 | Tussey | ................... | B02C 18/24 |
| 2019/0125132 A1* | 5/2019 | Powers | ................... | A47J 42/38 |
| 2020/0237157 A1* | 7/2020 | Lavalle | .................. | A47J 42/34 |
| 2020/0269254 A1* | 8/2020 | Abehasera | ............. | A47J 42/16 |

\* cited by examiner

HANDHELD SYSTEM AND METHOD FOR STORING AND GRINDING HERBS

BACKGROUND OF THE INVENTION

Field of the Invention

The field of this invention relates generally to the field of herb grinders and more particularly toward a portable grinder that grinds herbs manually, according to user preference, and stores the ground herbs hermetically therein.

Description of the Prior Art

Herb grinding tools have been around for centuries. The earliest mortar and pestle device dates back to 35,000 BCE. The Papyrus Ebers, which contains Egyptian medical documents, contain the first documented record of the mortar and pestle from 1550 BCE. The mortar and pestle were used in Egypt as both medical and culinary tools. By the 16th century, mortars were being decorated with handles, knobs, or sometimes even spouts. Both the mortar and pestle continued to be made of bronze through the middle ages and the Renaissance period. As tobacco use continued to gain popularity over the centuries, smokers who preferred lightweight grinders over mortars and pestles developed cases with small teeth protruding from each side that could be rotated to grind herbs.

Apothecaries and pharmacies later adopted the same concept, but miniaturized it in order to be used to process herbs and materials for customers, grinding as much as needed to fulfill every person's order. Generally, not much has changed with regard to compact herb grinders. Typically, there is a top half and a bottom section. Both sections are equipped with sharp teeth and are designed to be turned together in order to shred the content in the middle of the two parts of the grinder. Early grinders were traditionally made with stainless steel, which is considered dependable and very easy to clean. However, it is currently possible to find more affordable grinders made with materials such as plastic. Today there has been a resurgence in grinders due to laws being relaxed around recreational use of *cannabis* and grinders have become even more refined and especially adjusted for marijuana use. Some grinders even feature screens, which are placed in between the two compartments of the grinder in order to allow for the separate collection of trichomes. Trichomes are essentially resinous crystals that have a much higher concentration of THC, thus yielding a much powerful high and a greater psychoactive effect.

It is the object of the instant invention to provide an improved herb grinding device that overcomes the shortcomings of the prior art.

SUMMARY OF THE INVENTION

The device of the instant invention provides for a device for storing and grinding herbs comprising: a main body being formed by a front cover and a back cover wherein said main body is substantially rectangular shaped, said main body having a perimeter defined by said front cover and said back cover when said front and back covers are attached; wherein said front cover is slideably connected to a door wherein said front cover and said door are mated to said back cover along said perimeter wherein said door is moveable in a vertical direction away from said main body; an interior portion is defined by the mating of said front cover and door with said back cover; a first plurality of teeth extending downward from the interior portion of said front cover; a second plurality of teeth extending upward from the interior portion of said back cover such that said first plurality of teeth and said second plurality of teeth are in alignment when said front cover and said back cover are mated to form said main body; a corridor situated between said first and second plurality of teeth in the area of said main body distal said door; a first slot proximate said corridor for placement therein of a blade, said blade being attached to a rod in a perpendicular orientation to a turnable wheel and wherein a plurality of radially extending blades extend outward from said rod wherein said wheel is situated beyond said perimeter and wherein said rod with radially extending teeth is placed inside of said corridor; wherein no gears are present a second slot proximate said corridor but on the opposite side of said first slot wherein an openable and closeable shutter is provided to slide therethrough to either open or close said slot.

An alternate embodiment teaches a method for storing and grinding herbs comprising the steps of: acquiring a device for grinding herbs, said device further comprising: a main body being formed by a front cover and a back cover wherein said main body is substantially rectangular shaped, said main body having a perimeter defined by said front cover and said back cover when said front and back covers are attached; wherein said front cover is slideably connected to a door wherein said front cover and said door are mated to said back cover along said perimeter wherein said door is moveable in a vertical direction away from said main body; an interior portion is defined by the mating of said front cover and door with said back cover; a first plurality of teeth extending downward from the interior portion of said front cover; a second plurality of teeth extending upward from the interior portion of said back cover such that said first plurality of teeth and said second plurality of teeth are in alignment when said front cover and said back cover are mated to form said main body; a corridor situated between said first and second plurality of teeth in the area of said main body distal said door; a first slot proximate said corridor for placement therein of a blade, said blade being attached to a rod in a perpendicular orientation to a turnable wheel and wherein a plurality of radially extending blades extend outward from said rod wherein said wheel is situated beyond said perimeter and wherein said rod with radially extending teeth is placed inside of said corridor; a second slot proximate said corridor but on the opposite side of said first slot wherein an openable and closeable shutter is provided to slide therethrough to either open or close said slot; opening said door to expose said interior portion; placing herbs to be ground into said interior portion; closing said door; opening said shutter to expose said second slot for ground herbs to be expelled therefrom; turning said wheel thereby causing said herbs to pulled into said corridor; retrieving the ground herbs from said second slot; and closing said shutter.

An alternate embodiment teaches a method of manufacturing the blade as defined above, comprising the steps of: acquiring a rod, said rod having a first end and a second end; producing a series of sub-assemblies, each such assembly being disc-shaped, having a top, a bottom, a center aperture and a perimeter with a surface wherein a male member is located on one side of said disc-shaped sub-assembly and a female member is located on the opposite side of said disc-shaped sub-assembly such that one sub-assembly is affixable to a second sub-assembly wherein a plurality of radially-extending teeth are affixed along said surface of said perimeter of each sub-assembly and extending outwardly therefrom; affixing each sub-assembly to an adjacent sub-assembly forming a cylinder formed from a series of said sub-assemblies; placing said rod through said cylinder; affixing said first end of said rod to a turnable wheel; and affixing said second end of said rod into said corridor.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
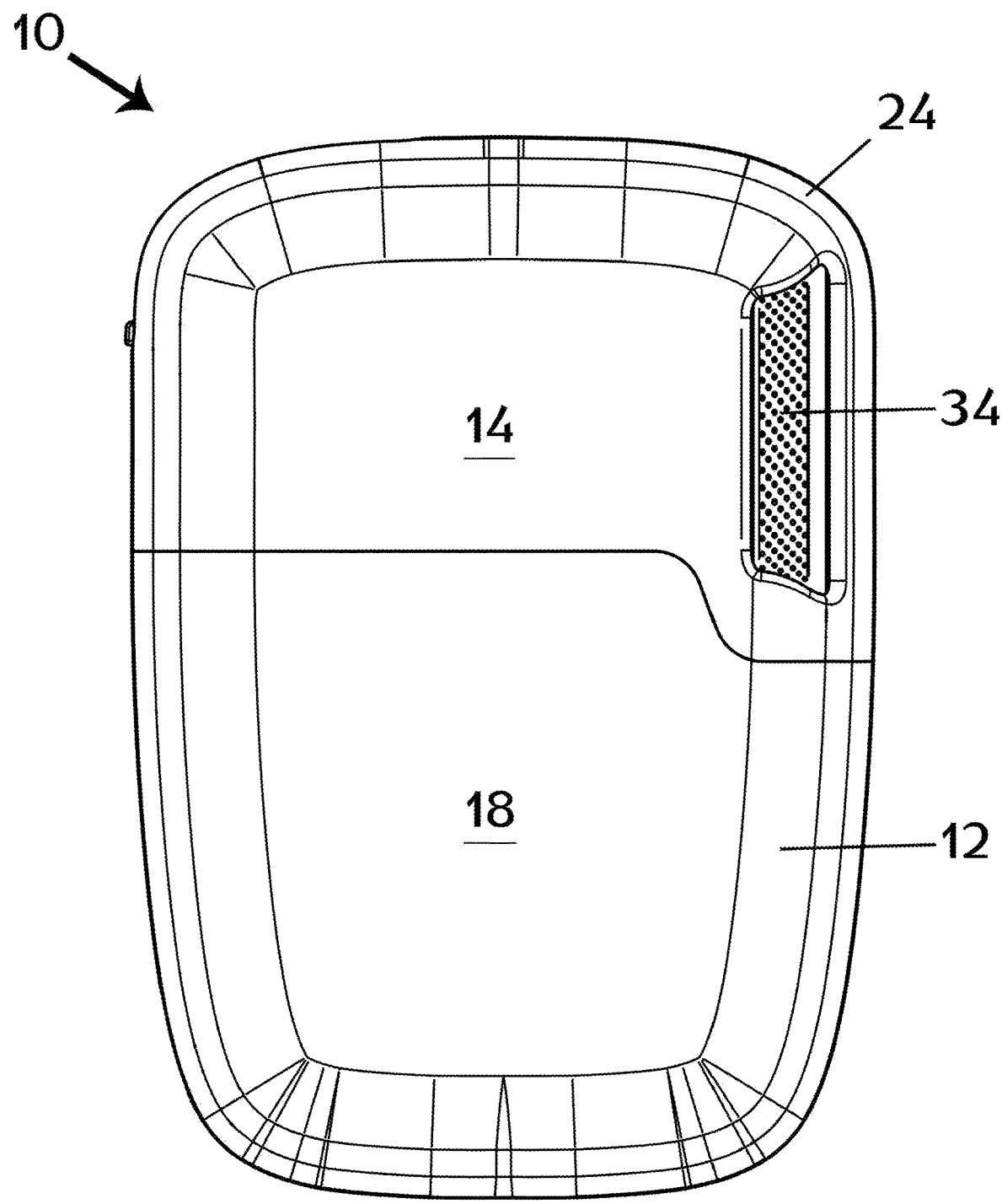
FIG. 1 is front view of the device of the instant invention.
Figure 2:
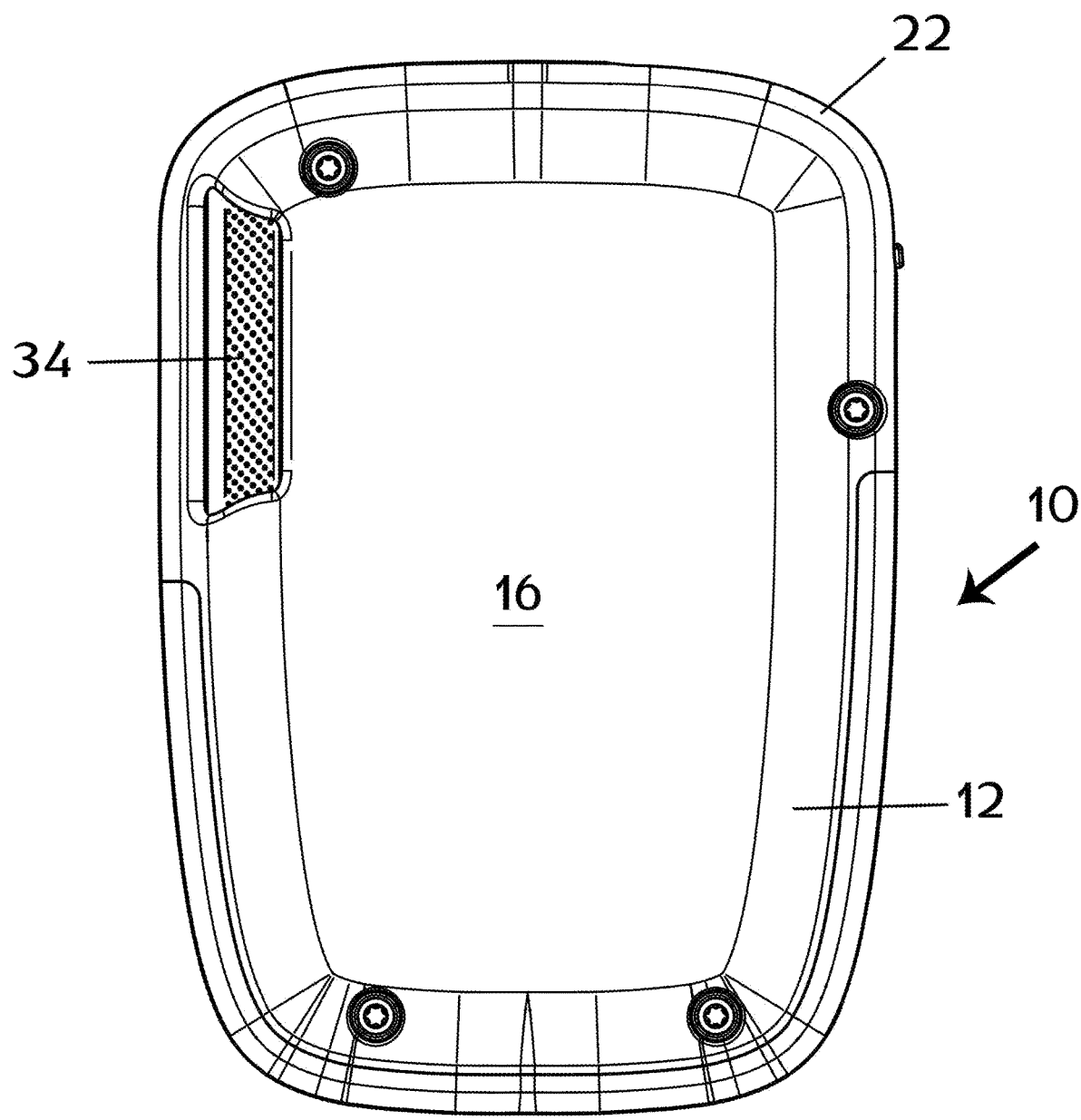
FIG. 2 is a back view of the device of the instant invention.
Figure 3:
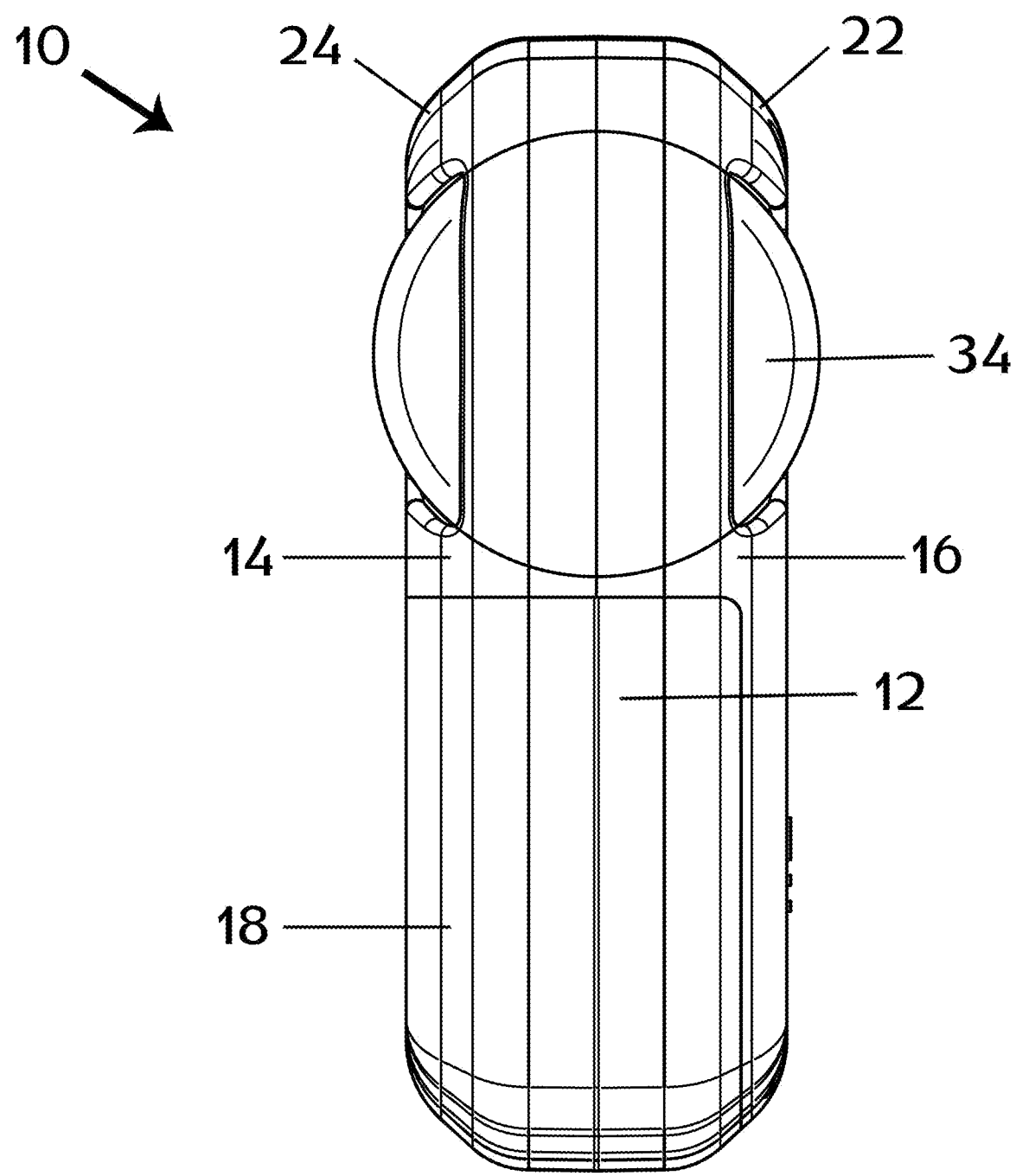
FIG. 3 is a first side view of the device of the instant invention.
Figure 4:
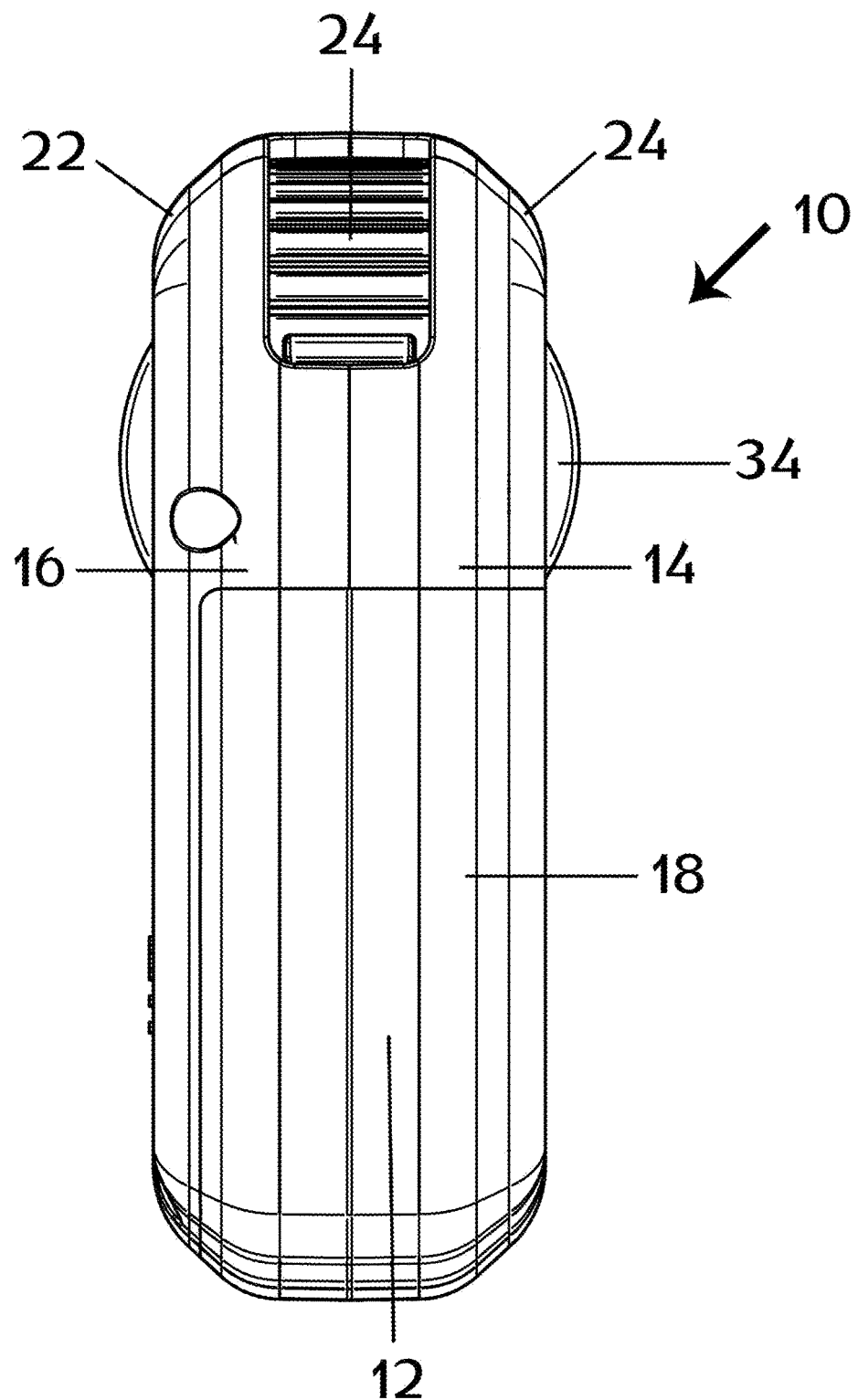
FIG. 4 is a second side view of the device of the instant invention.
Figure 5:
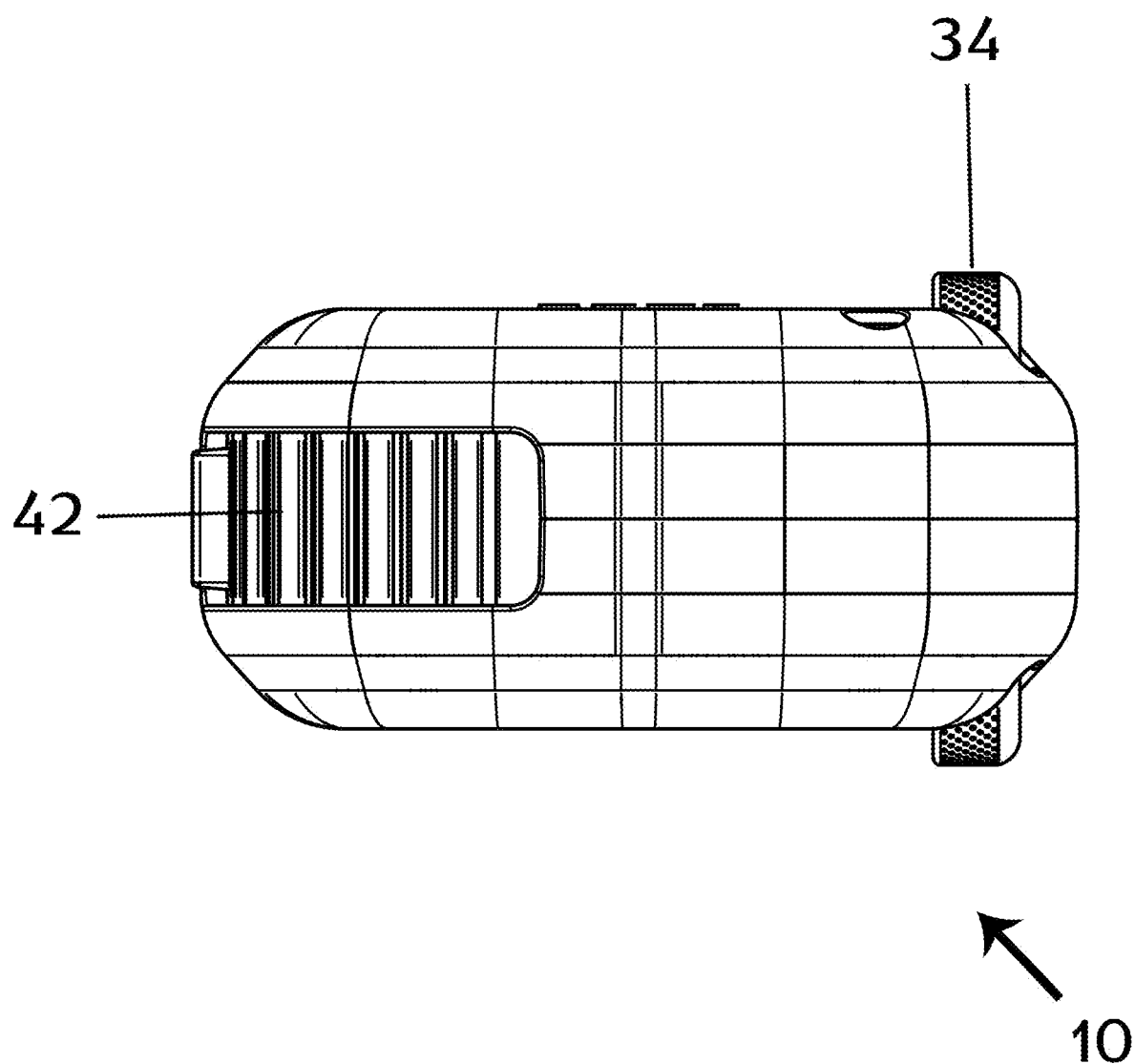
FIG. 5 is a top view of the device of the instant invention.
Figure 6:
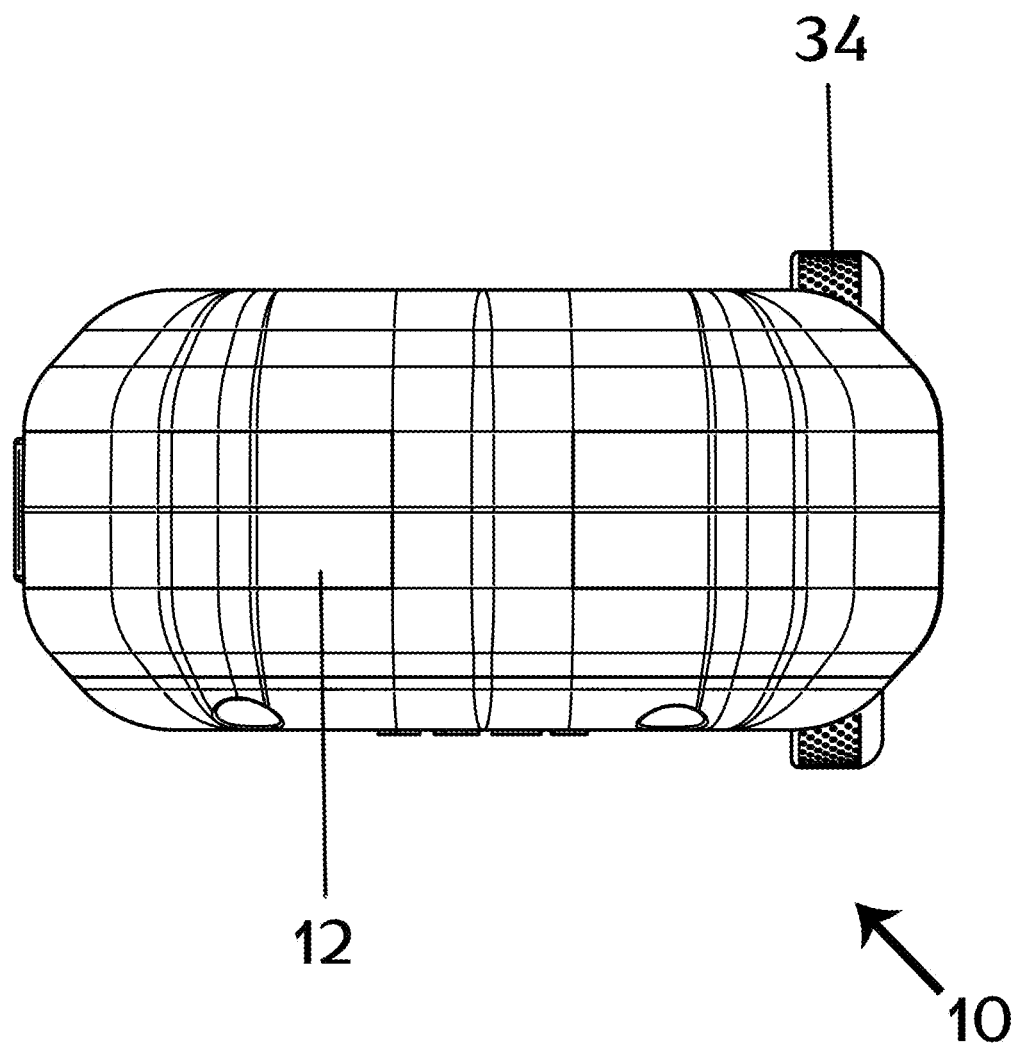
FIG. 6 is a bottom view of the device of the instant invention.

Turning to the drawings, the preferred embodiment is illustrated and described by reference characters that denote similar elements throughout the several views of the instant invention.

The device herein disclosed and described provides a solution to the shortcomings in the prior art through the disclosure of a method and system for storing and grinding herbs. An object of the invention is to allow a user to grind herbs to a smaller aggregate size. A user stores herbs in one side of the grinder until ready to grind.

Another object of this invention is to provide a means to grind herbs manually. The crusher incorporates star blades along an axle. This axle is turned using a finger wheel on the exterior of the device affording a user greater control of the crushing process. The wheel will grind the herbs no matter which direction the wheel is turned.

Another object of the aforementioned invention is to provide a means to store uncrushed herbs until the time the user is ready to grind them without the need for prior or future preparations.

Another object of the aforementioned invention is to provide a means to store uncrushed herbs prior to grinding in a sealed environment to keep it fresh.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

The accompanying drawings, which are incorporated herein and form a part of the specification, illustrate some, but not the only or exclusive, examples of embodiments and/or features.

Other aspects of the present invention shall be more readily understood when considered in conjunction with the accompanying drawings, and the following detailed description, neither of which should be considered limiting.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 7:
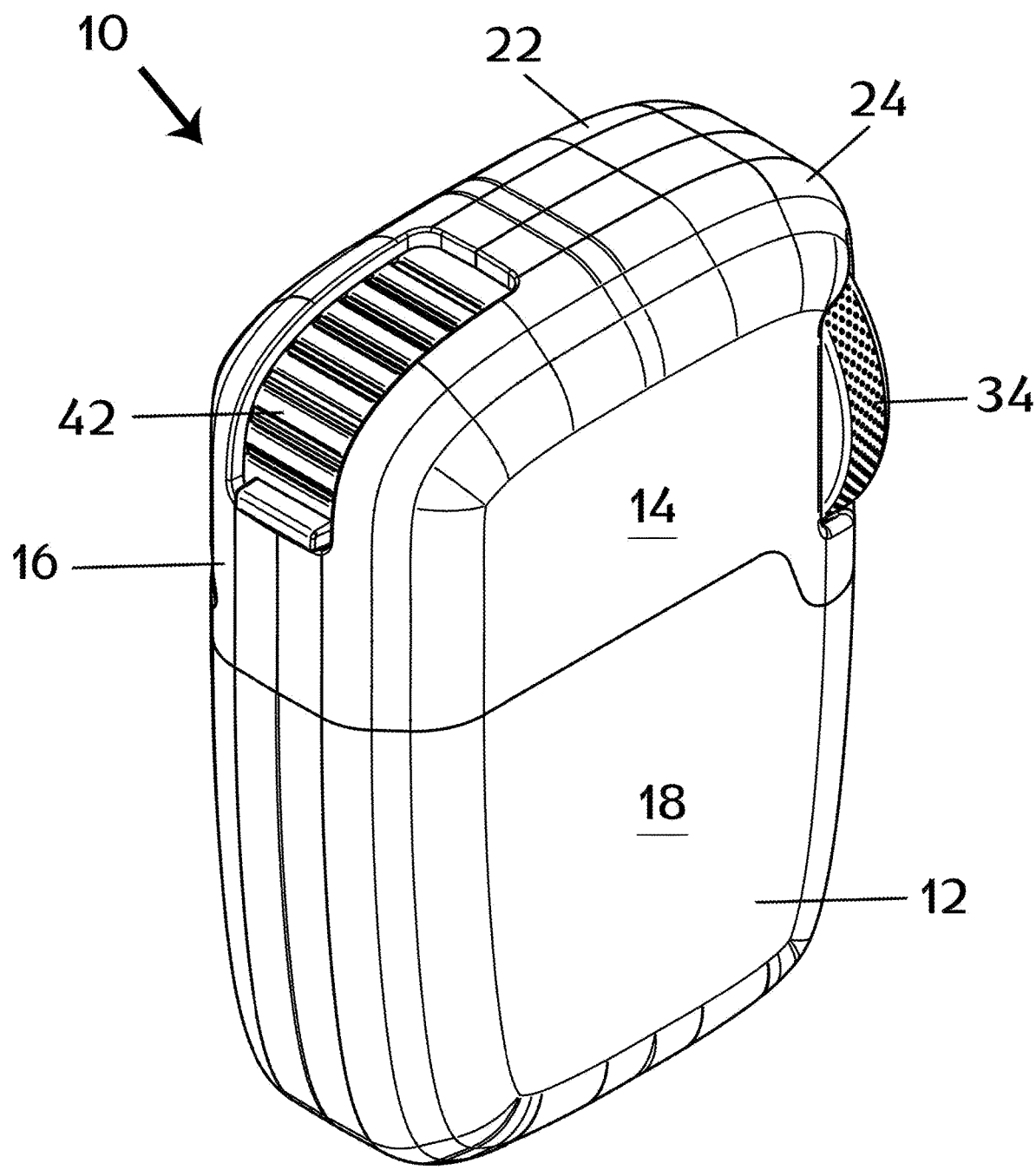
FIG. 7 is an isometric view of the device of the instant invention.

FIG. 7 shows a perspective view of the herb grinding device 10 of the instant invention. The overall shape of the invention being a cube-shaped device with filleted corners and fitting in the palm of a user's hand.

Figure 8:
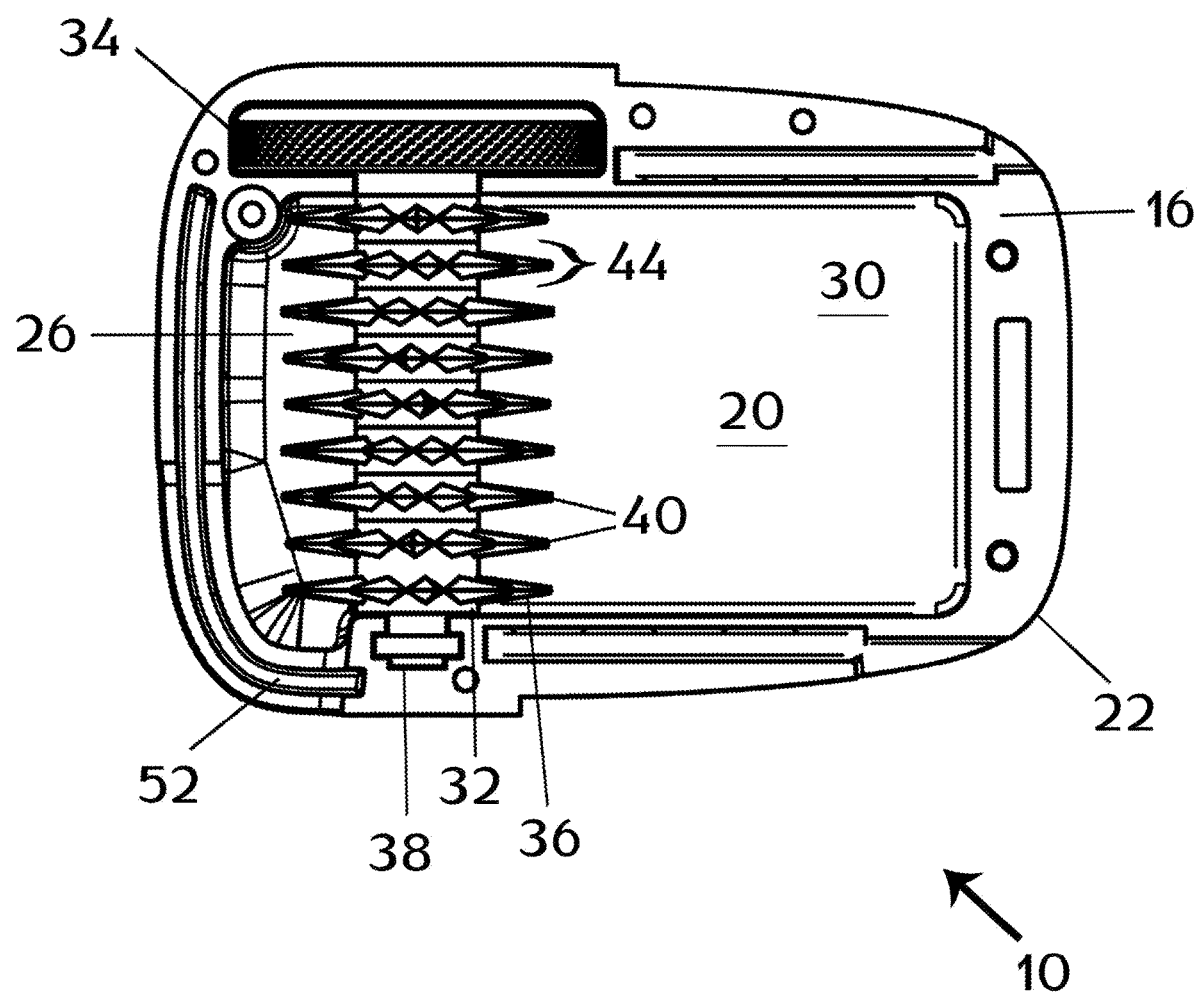
FIG. 8 is a top see-through view of the device of the instant invention showing the interior parts.
Figure 9A:
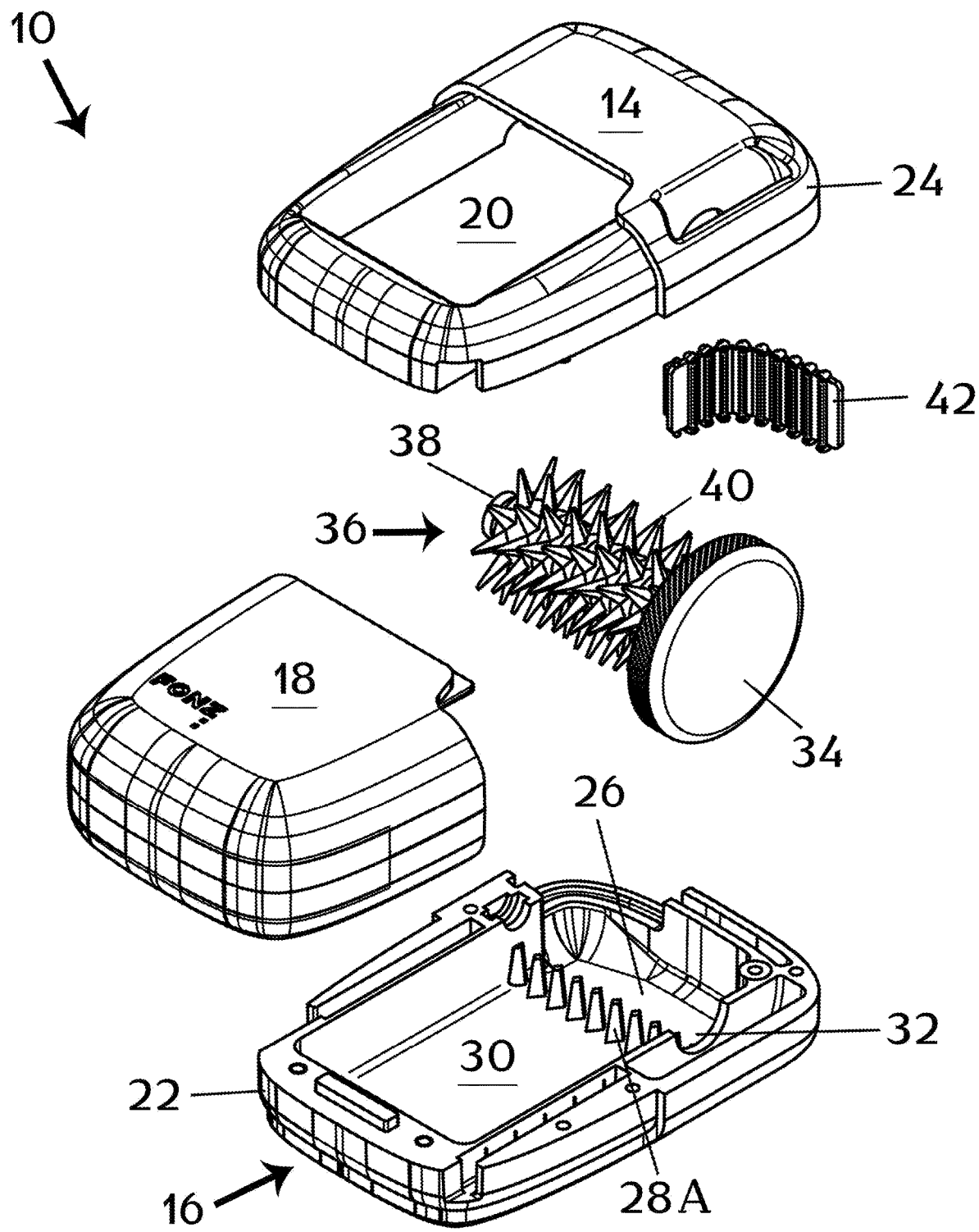
FIG. 9A is a top exploded view of the device of the instant invention.
Figure 9B:
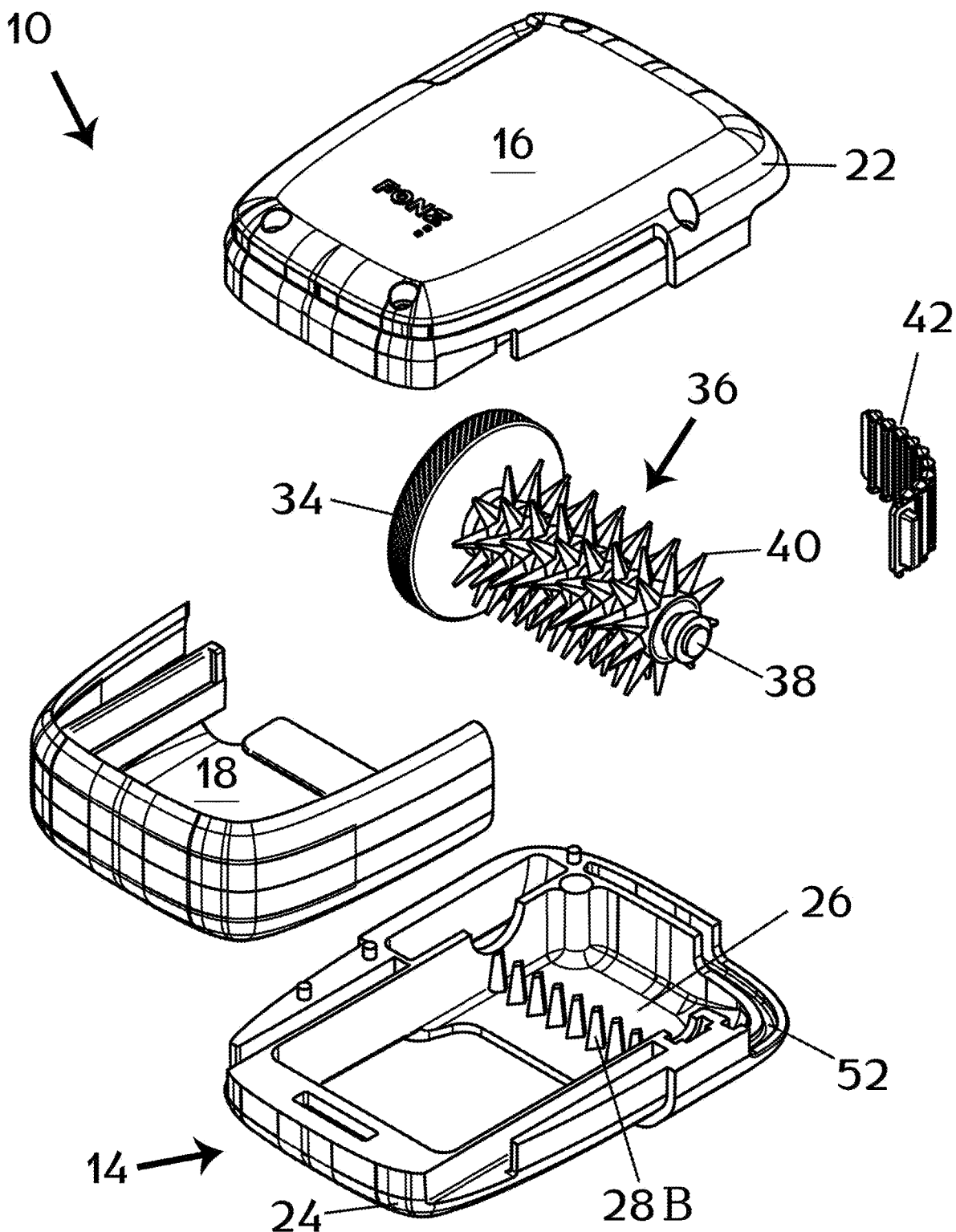
FIG. 9B is a bottom exploded view of the device of the instant invention.

FIGS. 1-6 illustrate the exterior appearance of the device from all angles. FIGS. 8-13 illustrate the operational features of the device. FIG. 8 shows an interior view of the moving parts inside of the back cover 16 of the grinder 10. The invention is a grinding device 10 consisting of a main body 12 that has a front cover 12, a back cover 16 and a slideable door 18 on the front cover 14 that allows access to the interior 20 of the device. Both the front cover 12 and the back cover 12 are made of aluminum and the door 18 is made of plastic.

The perimeter 22 of the back cover 16 is fitted with parts that mate with parts on the perimeter 24 of the front cover 14 and the door 18. The door 18 is slideable in a vertical direction along the perimeter 22 of the back cover 16. Between the front cover 14 and the back cover 16 is a corridor 26 in the interior 20 of the device 10. In this corridor 26 is defined by a series of sharpened teeth 28A extending upward from the interior surface of the back cover 16 and a series of sharpened teeth 28B extending downward from the interior surface of the front cover 14. This provides a demarcation point between the portion 30 into which unground herbs are placed and the corridor 26 where the herbs are ground. The sharpened teeth 28A, 28B are comprised of a rigid material such as, but not limited to, stainless steel, aluminum and the like thereby allowing it to crush and serrate herbs therebetween.

Between the row of sharpened teeth 28A on the back cover 16 and the bottom part of the perimeter 22 of the back cover 16 is a slot 32 for the placement therein of the wheel 34 and rotating blade 36, said rotating blade 36 consisting of a rod 40 through the center that attaches to the wheel 34 and a plurality of extending teeth 40 that rotate in the slot 32 when the wheel 34 is actuated by the user. Each of the parts on the blade 36, i.e., the wheel 34, the rod 38 and the sub-pieces 44 forming the radially extending teeth 40 are fused together as a single piece before the blade 36 is placed inside of the slot 32 in the back cover 16. The wheel 34 sits outside of the perimeter 22 of the back cover 16 and the perimeter 24 of the front cover 14 and is accessible by the user easily to turn the blade 36.

On the end of the perimeter 22 of the back cover 16 and the perimeter 24 of the front cover 14 and proximate the end with the wheel 34 is a shutter 42 which is made of plastic. The shutter 42 is openable and closeable inside of a slot 52 formed in the corner along the perimeter 22 of the back cover 16 and the perimeter 24 of the front cover 14 to allow for the removal of ground herbs once they have passed through the sharpened teeth 28A, 28B into the corridor 26 to be ground by the plurality of teeth 40 on the blade 36 as it they rotate around the rod 38 through the movement of the wheel 34 by the user's finger.

To use, the user places herbs 54 into the interior 20 of the device 10 by sliding open the door 18 and exposing the area into which herbs can be placed. (See FIGS. 11A-13). The door 18 is then slid shut and the user turns tips the device 10 such that gravity will pull the herbs to come into contact with the blades 40 on the blade 36, which due to their unique spiral design will pull the herbs 54 and crush them between the sharpened teeth 28B of the front cover 14 and the sharpened teeth 28A of the back cover 16 moving only the crushed herbs into the output corridor 26. The user than turns the wheel 34 causing the herbs to get moved through the plurality of teeth 40 on the blade 36 as the wheel 34 causes the rod 38 to turn the blade 36. As noted above, the wheel 34 can be turned in either direction indicated in FIGS. 12 and 13 callout 56. Before grinding, the user opens the shutter 42. Once open, the ground herbs fall out in conjunction with the turning of the wheel 34. The user stops grinding once enough grinded herbs 54 fall out from the opening created in the slot 52 when the shutter 42 is open.

Figure 10A:
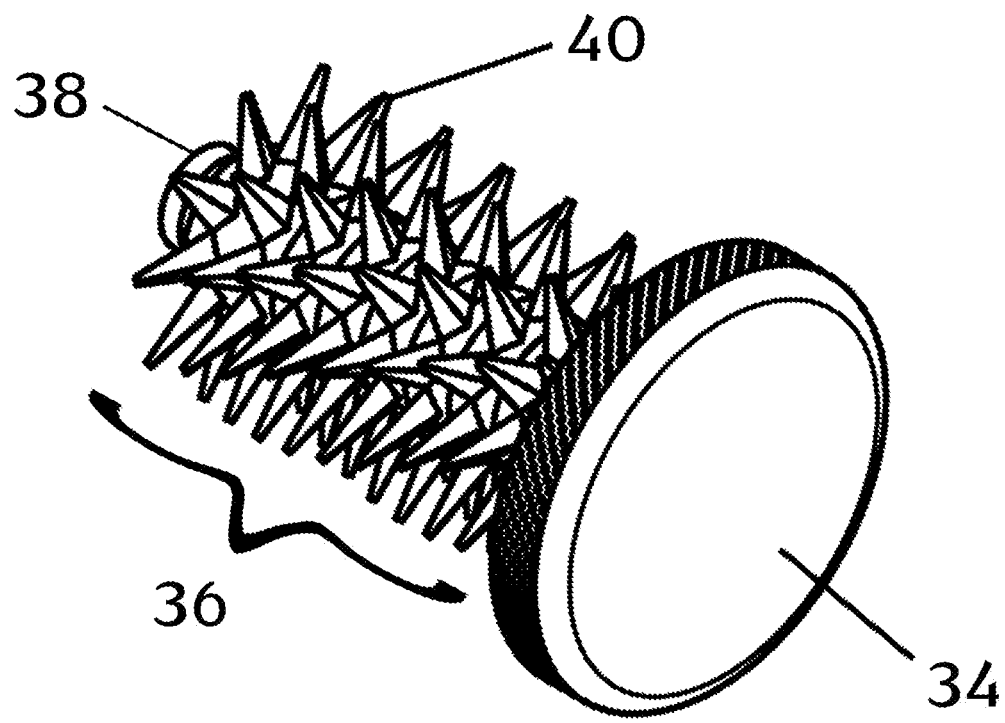
FIG. 10A is an isometric view of the wheel an blade of the device of the instant invention.
Figure 10B:
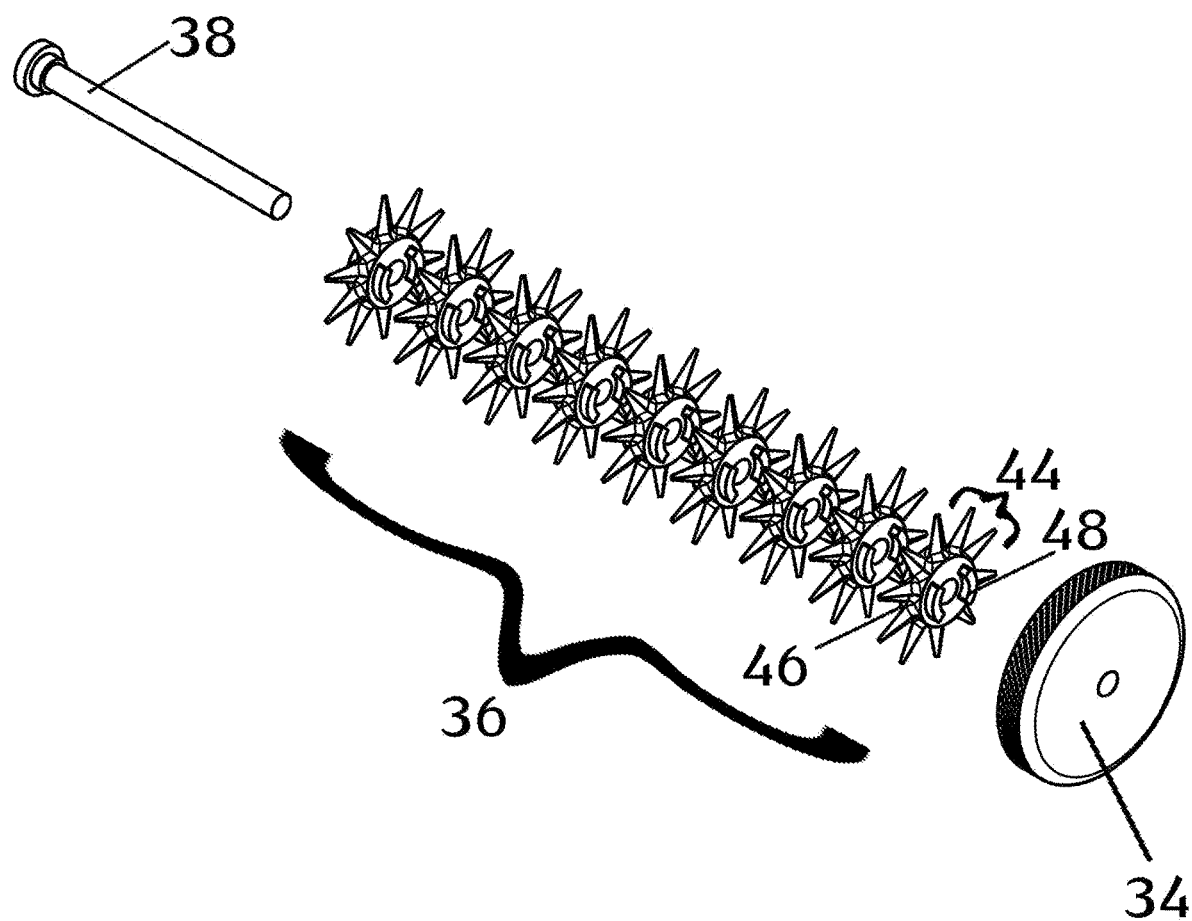
FIG. 10B is an exploded view of the wheel and blade of the device of the instant invention.
Figure 11A:
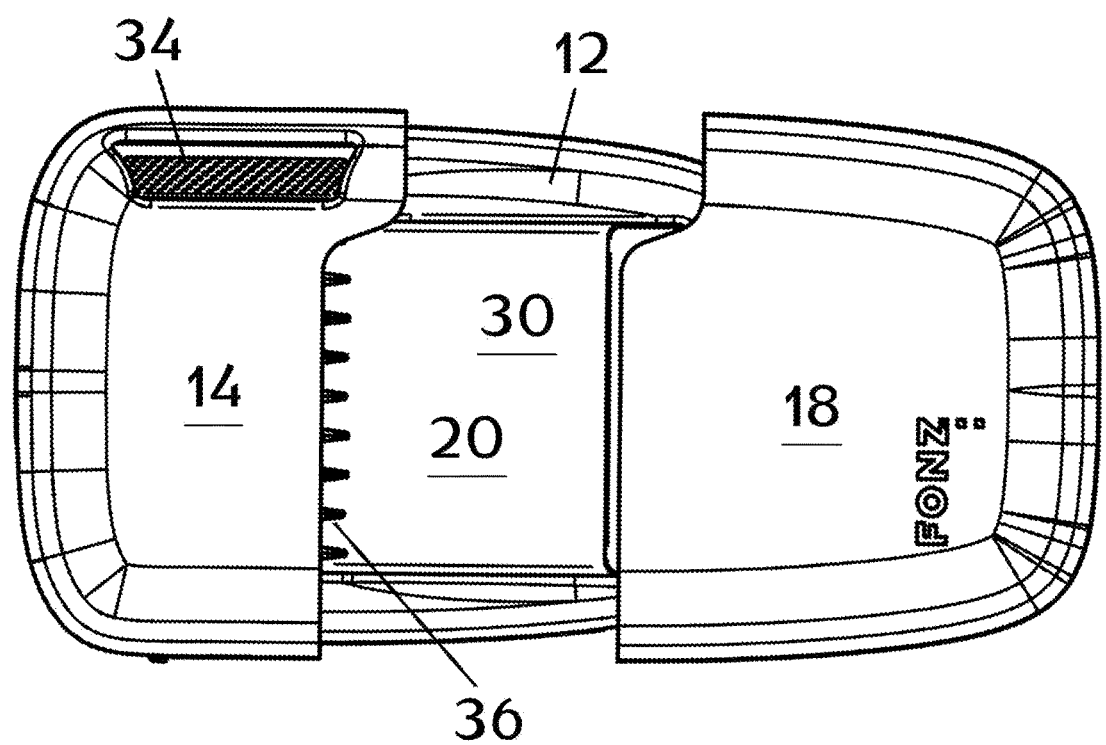
FIG. 11A is a top view of the device of the instant invention with the front cover open, exposing the interior.
Figure 11B:
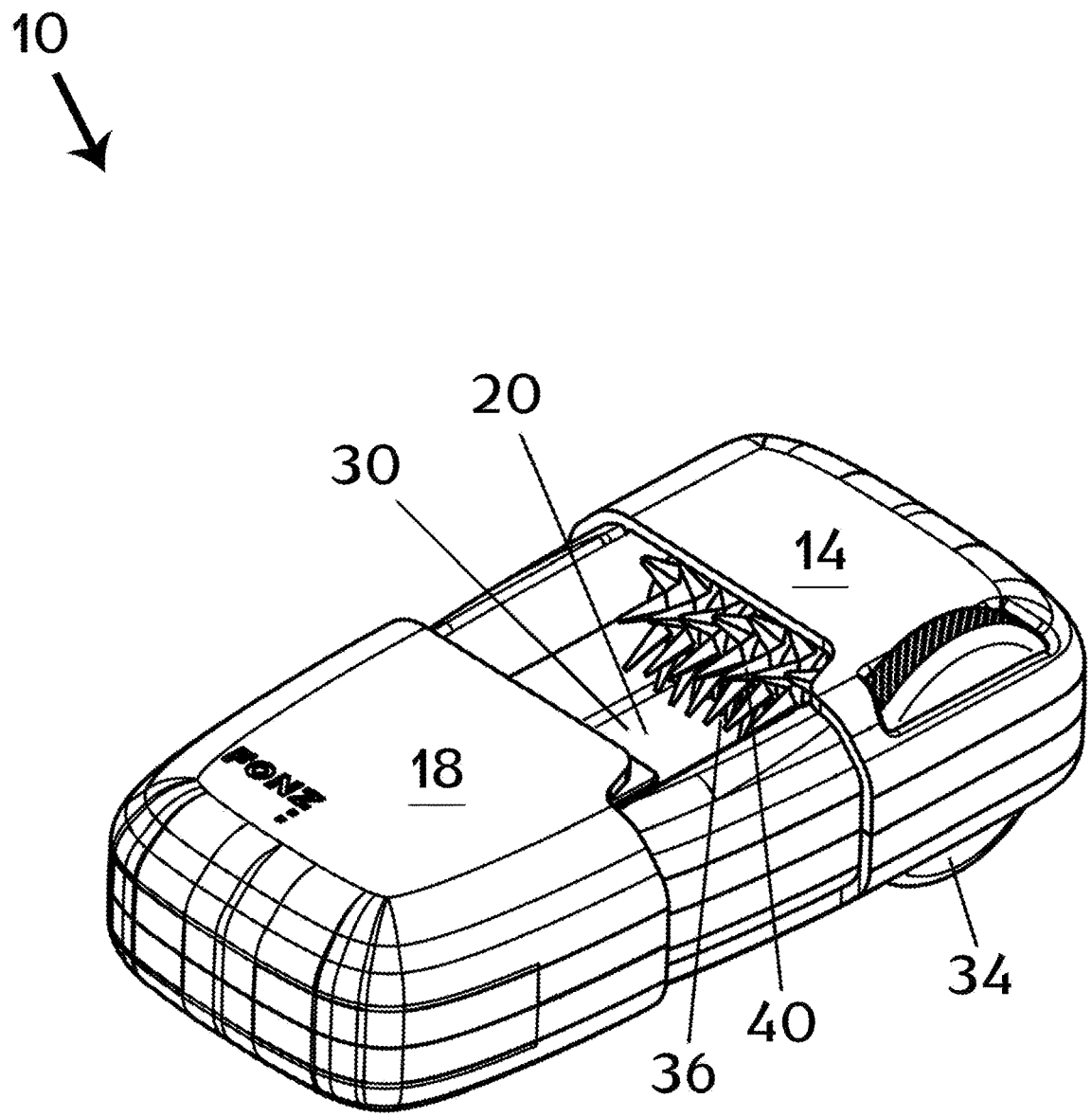
FIG. 11B is a perspective view of FIG. 11A.
Figure 12:
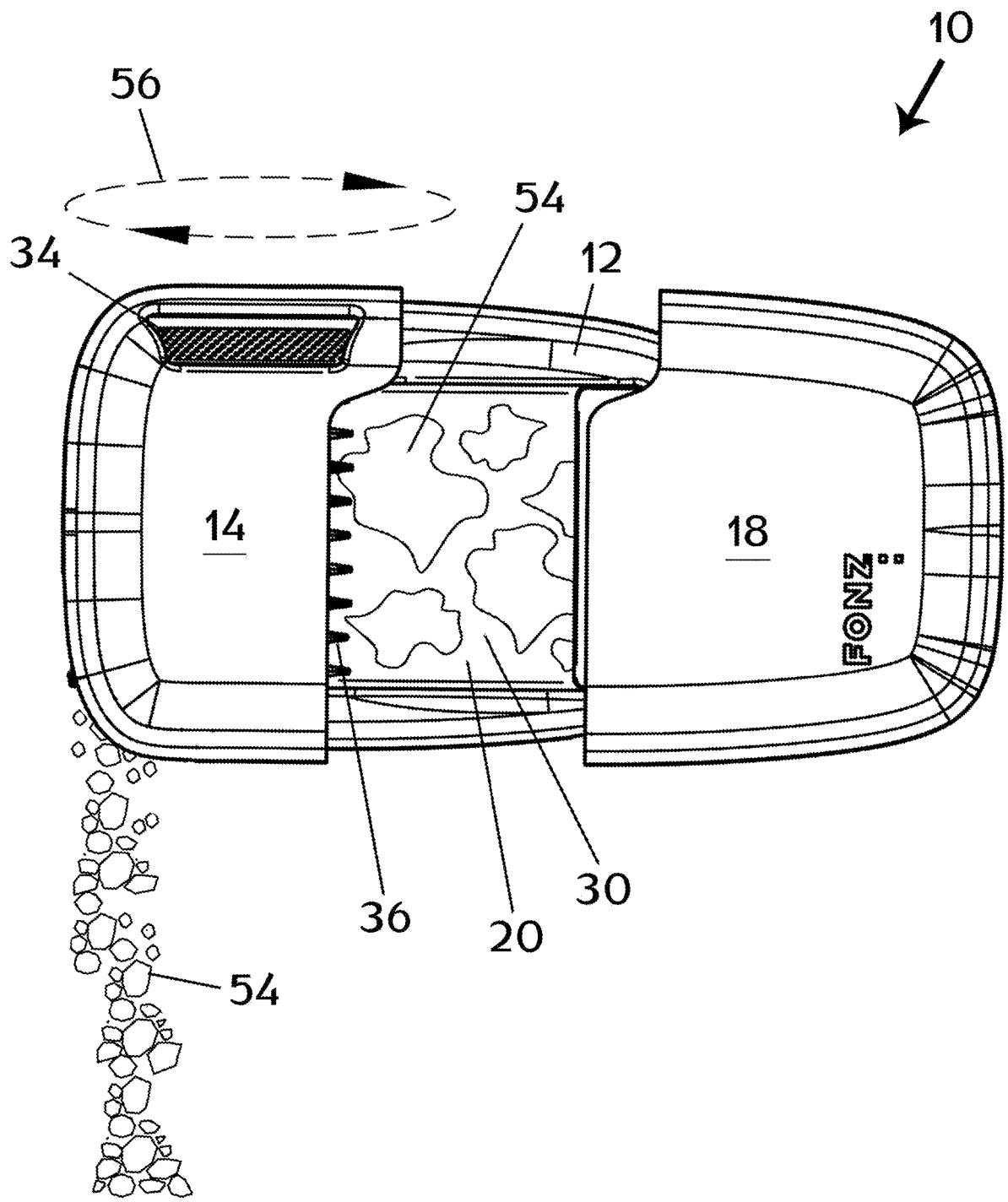
FIG. 12 is a top view of the device of the instant invention with unground herbs show in the interior indicating that the turn of the wheel will allow herbs to be ground and expelled therefrom.
Figure 13:
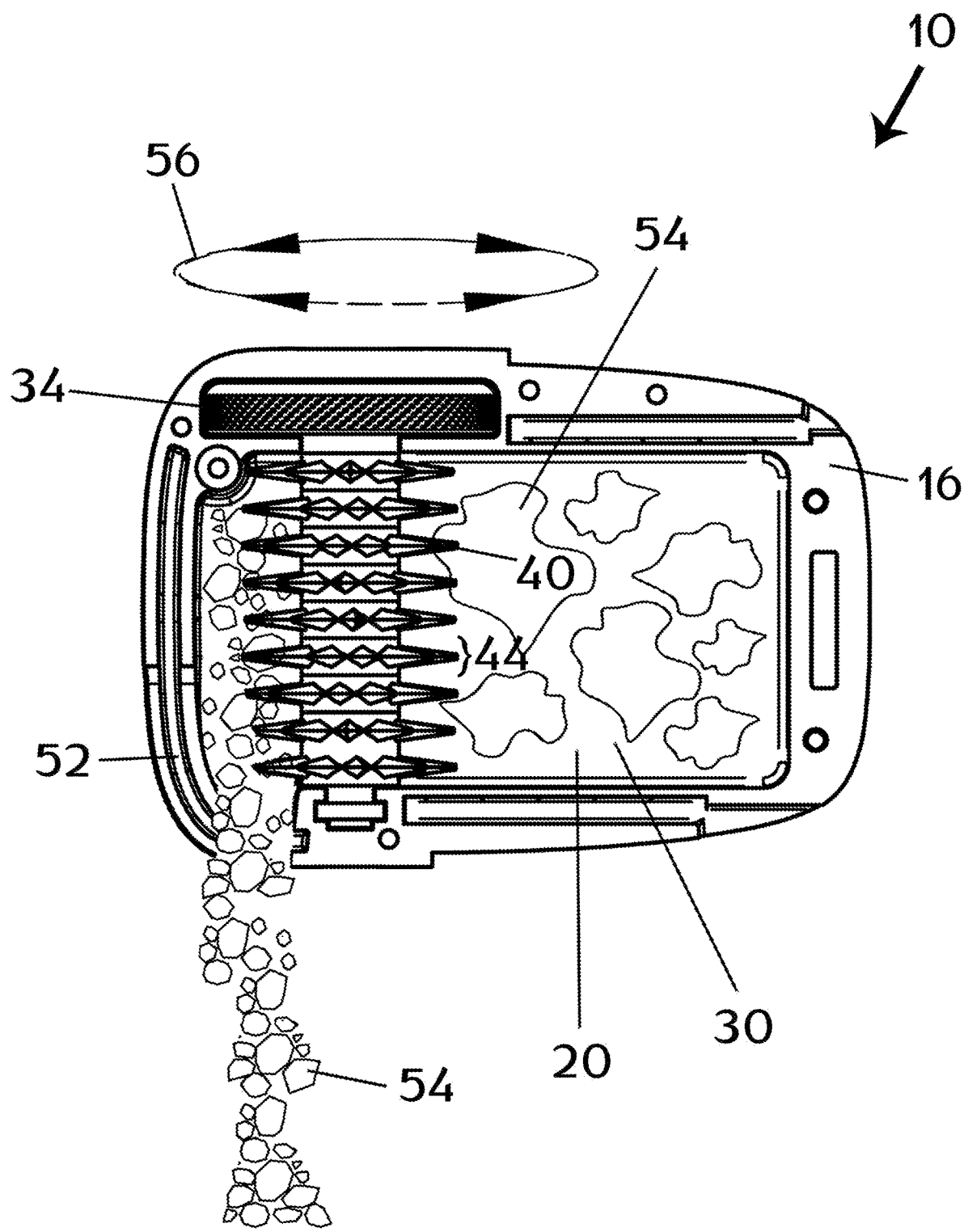
FIG. 13 is a top view of the interior of the device of the instant invention with the top cover and door missing, otherwise the same view as FIG. 12.
Figure 14:
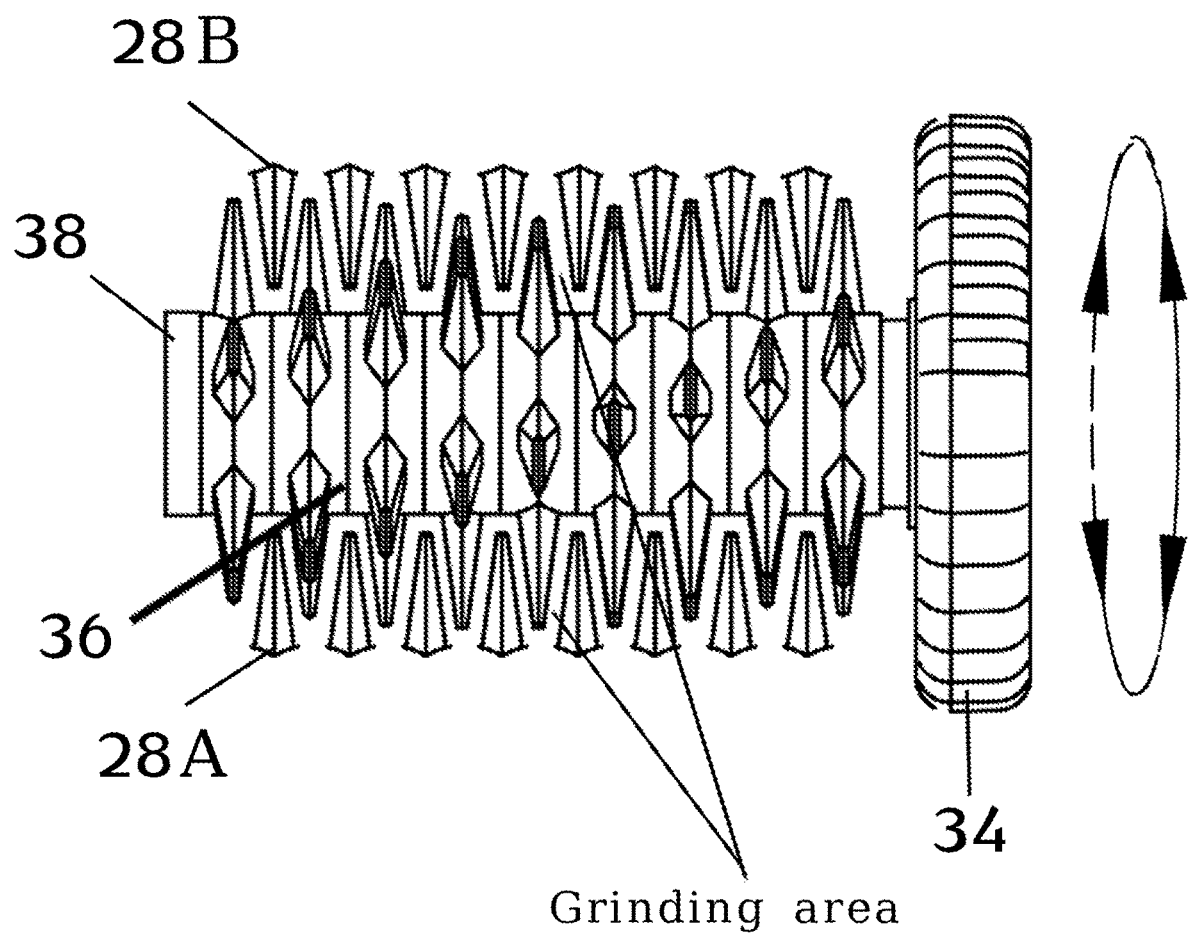
FIG. 14 is a side view of the blade and wheel assembly of the device of the instant invention.

FIGS. 10A-10B shows the method of manufacturing the wheel 34 and blade 36 of the device 10 of the instant invention. FIG. 10A shows the assembled wheel 34 and blade 36. The spiral design of the teeth 40 is key to the functionality of the device and its manufacture is complex. Because of its complexity, the method of manufacturing involves three pieces: the rod 38, the blade 36 and the wheel 34. As noted above the plurality of spiral teeth 40 is key to the efficient functioning of the device 10. The spiral teeth 40 distribute the force needed to grind the herbs as opposed to a design where the blades would be aligned in straight groups and the grinding process would be achieved with a few big grinding pulses rather than multiple small grinding pulses provided by the instant design. The spiral design also produces a pulling effect on the herbs, i.e., only the herb comes into contact with the blade. The initial contact between the herb and the blades is achieved by gravity alone.

FIG. 10B demonstrates how the assembly comes together to maintain the design and ease of manufacture. There is the central rod 38 around which the blade 36 with its spiral plurality of teeth 40 is placed therearound. The blade 36 and rod 38 are then attached to the wheel 34. As shown in this figure, the blade 36 is actually 9 separate sub-pieces 44 that become a single piece 36 when wrapped around the rod 38. Each sub-piece 44 has a female component 46 and male component 48 that allows each sub-piece 44 to attach to the adjacent one through a pressing method. Each sub-piece 44 is circular with an aperture 50 in the center through which the rod 38 is situated. The female component 46 is one side of the sub-piece 44 and the male component 48 is on the opposite side. Extending radially outward from the sub-piece 44 are the plurality of teeth 40 that rotate around the herbs when the wheel 34 is actuated.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A portable device for storing and grinding herbs comprising:
   a main body being formed by a front cover and a back cover, said main body having a perimeter defined by said front cover and said back cover when said front and back covers are attached;
   wherein said front cover is slideably connected to a door wherein said front cover and said door are mated to said back cover along said perimeter wherein said door is moveable in a vertical direction away from said main body;
   an interior portion is defined by the mating of said front cover and door with said back cover;
   a first plurality of teeth extending a first direction away from the interior portion of said front cover;
   a second plurality of teeth extending in a second direction opposite from said first plurality of teeth from the interior portion of said back cover such that said first plurality of teeth and said second plurality of teeth are in alignment when said front cover and said back cover are mated to form said main body;
   a corridor situated between said first and second plurality of teeth in the area of said main body distal said door
   a first slot proximate said corridor for placement therein of a single integrally formed one-piece blade and wheel assembly into which a centralizing rod is placed that extends a length of said blade and wheel assembly, said blade and wheel assembly being turnable in both directions and wherein a plurality of pyramidal-shaped radially extending cutting blades extend outward from said blade and wheel assembly, said plurality of pyramidal-shaped radially extending cutting blades are connected one to another by a male/female formation on each blade, laced around said rod, which is connected on a first end to a wheel of said blade and wheel assembly which connects by the same male/female formation to said plurality of pyramidal-shaped radially extending cutting blades and terminates at a second end of said blade and wheel assembly wherein said wheel of said blade and wheel assembly is situated beyond said perimeter and wherein said rod with pyramidal-shaped radially extending blades are placed inside of said corridor wherein no gears are present;
   a second slot proximate said corridor but on the opposite side of said first slot wherein an openable and closeable shutter is provided to slide therethrough to either open or close said slot;
   wherein said corridor provides a passage way into which ground herbs are retrieved on their way out through the exit hole when said shutter is open; and
   a storage compartment for unground herbal material that has not passed through said corridor wherein said storage compartment comprises more than half of said interior space for the storage therein of said unground herbal material to be ground when desired.

2. A method of manufacturing the blade and wheel assembly as defined in claim 1, comprising the steps of:
   acquiring said rod, said rod having a first end and a second end;
   producing a series of sub-assemblies, each sub-assembly being disc-shaped, having a top, a bottom, a center aperture and a perimeter with a surface wherein a male member is located on one side of said disc-shaped sub-assembly and a female member is located on the opposite side of said disc-shaped sub-assembly such that one sub-assembly is affixable to a second sub-assembly wherein said plurality of pyramidal-shaped radially-extending cutting blades are affixed along said surface of said perimeter of each sub-assembly and extending outwardly therefrom;
   affixing each sub-assembly to an adjacent sub-assembly forming a cylinder formed from a series of said sub-assemblies;
   placing said rod through said cylinder;
   affixing said first end of said rod to said turnable wheel of said blade and wheel assembly which is turnable in either direction; and
   affixing said second end of said rod into said corridor.

3. A method for storing, grinding and carrying herbs comprising the steps of:
   acquiring a portable device for grinding herbs, said device further comprising:
   a main body being formed by a front cover and a back cover said main body having a perimeter defined by said front cover and said back cover when said front and back covers are attached;
   wherein said front cover is slideably connected to a door wherein said front cover and said door are mated to said back cover along said perimeter wherein said door is moveable in a vertical direction away from said main body;
   an interior portion is defined by the mating of said front cover and door with said back cover;

a first plurality of teeth extending a first direction away from the interior portion of said front cover;

a second plurality of teeth extending in a second direction opposite from said first plurality of teeth from the interior portion of said back cover such that said first plurality of teeth and said second plurality of teeth are in alignment when said front cover and said back cover are mated to form said main body;

a corridor situated between said first and second plurality of teeth in the area of said main body distal said door a first slot proximate said corridor for placement therein of a single integrally formed one-piece blade and wheel assembly into which a centralizing rod is placed that extends a length of said blade and wheel assembly, said blade and wheel assembly being turnable in both directions and wherein a plurality of pyramidal-shaped radially extending cutting blades extend outward from said blade and wheel assembly, said plurality of pyramidal-shaped radially extending cutting blades are connected one to another by a male/female formation on each blade, laced around said rod, which is connected on a first end to a wheel of said blade and wheel assembly which connects by the same male/female formation to said plurality of pyramidal-shaped radially extending cutting blades and terminates at a second end of said blade and wheel assembly wherein said wheel of said blade and wheel assembly is situated beyond said perimeter and wherein said rod with pyramidal-shaped radially extending blades are placed inside of said corridor wherein no gears are present;

a second slot proximate said corridor but on the opposite side of said first slot wherein an openable and closeable shutter is provided to slide therethrough to either open or close said slot;

wherein said corridor provides a passage way into which ground herbs are retrieved on their way out through the exit when the shutter is open; and a storage compartment for unground herbal material that has not passed through said corridor wherein said storage compartment comprises more than half of said interior space for the storage therein of said unground herbal material to be ground when desired;

opening said door to expose said interior portion;

placing herbs to be ground into said interior portion;

closing said door;

opening said shutter to expose said second slot for ground herbs to be expelled therefrom;

turning said wheel in either direction thereby causing said herbs to pulled into said corridor;

retrieving the ground herbs from said second slot;

closing said shutter; and keeping said portable device on or near a user for use as desired.

* * * * *